US 6,575,262 B2

(12) United States Patent
Nagatsuka

(10) Patent No.: US 6,575,262 B2
(45) Date of Patent: Jun. 10, 2003

(54) SKID STEER LOADER FRAME

(75) Inventor: Isao Nagatsuka, Hanyu (JP)

(73) Assignee: Komatsu Utility Europe S.p.A., Noventa Vicentina (IT)

( * ) Notice: Subject to any disclaimer, the term of this patent is extended or adjusted under 35 U.S.C. 154(b) by 32 days.

(21) Appl. No.: 09/886,049

(22) Filed: Jun. 22, 2001

(65) Prior Publication Data
US 2002/0139601 A1 Oct. 3, 2002

(30) Foreign Application Priority Data
Mar. 29, 2001 (EP) .......................................... 01830215

(51) Int. Cl.$^7$ ............................................... B62D 21/00
(52) U.S. Cl. ....................................... 180/312; 280/781
(58) Field of Search ................................. 180/312, 311, 180/89.1, 89.12; 280/781, 785, 797; 296/190.01, 190.08, 196, 203.01, 204; 414/697

(56) References Cited

U.S. PATENT DOCUMENTS

| 3,963,131 A | * | 6/1976 | Dimmer .................. 180/89.12 |
| 4,055,262 A | * | 10/1977 | Bauer et al. ............. 180/89.12 |
| T966,007 I4 | * | 1/1978 | Liehr et al. ................ 296/28 R |
| 4,514,007 A | * | 4/1985 | Macht ......................... 296/183 |
| 4,711,467 A | * | 12/1987 | Link et al. ................... 280/785 |
| 6,098,739 A | * | 8/2000 | Anderson et al. ............ 180/312 |
| 6,102,471 A | * | 8/2000 | Sasser et al. ........... 296/190.05 |
| D450,718 S | * | 11/2001 | Muraro ......................... D15/25 |

* cited by examiner

Primary Examiner—Paul N. Dickson
Assistant Examiner—David R. Dunn
(74) Attorney, Agent, or Firm—Browdy and Neimark, P.L.L.C.

(57) ABSTRACT

A Skid Steer Loader frame comprising a base element having a front edge, a rear edge and two lateral edges, two lateral elements substantially specular relative to each other, and each fastened to one of the lateral edges of the base element, and a front element integrally fastened to the base element and to each of the lateral elements. The lateral elements, the front element and the base element define a housing compartment. The lateral elements have a base portion and a coupling portion integrally fastened over the base portion, posteriorly relative to the base element. The base portion of each lateral element has an upper section that can be associated in abutment to a cab of a Skid Steer Loader, and defining a depression to allow lateral access to the housing compartment. The frame further comprises removable stiffening means.

13 Claims, 3 Drawing Sheets

SKID STEER LOADER FRAME

BACKGROUND OF THE INVENTION

1. Technical Field of the Invention

The present invention relates to a Skid Steer Loader frame.

2. Prior Art

Skid Steer Loaders are provided with frames whereon are mounted the cab, the working arm, the wheels and the operative equipment.

In particular a first known type provides for frames obtained by means of welding and composed of a base element with substantially horizontal development from whose front and lateral edges develop upwards respectively a front wall having, in front elevation view, a rectangular shape and two mutually specular lateral walls having, in lateral elevation view, an "L" shape. The base portion of the L has a squared off profile, higher than the front wall.

Over the base portions of the L shaped walls is mounted the drive's cab of the Skid Steer Loader, whilst laterally thereto are fastened the wheels.

The vertical portions of the two L's are positioned in correspondence with the rear part of the base element.

The two parts of the vertical portions of the L's oriented towards the front part of the frame are also connected by means of a welded "S" shaped connecting element, which is indispensable to guarantee a good rigidity to the frame since on the vertical portions of the L shaped walls is secured the operative arm of the Skid Steer Loader.

The three vertical walls and the base element define among them a housing compartment in which all the equipment of the Skid Steer Loader is inserted.

This first type of frame, however, has considerable drawbacks.

A first drawback occurs when assembling the machine on the assembly line.

With frames constructed according to this first example of prior art, the mounting of the operative equipment in the housing compartment of the frame must necessarily be effected piece by piece within said compartment. Because of the shape of the frame, once the equipment is mounted inside the compartment it is stuck therein and can only be removed by disassembly.

A second drawback stems from the fact that, due to the shape of the housing compartment given by the vertical walls, it is inconvenient to perform maintenance operations on the operative equipment located inside said compartment.

An additional drawback is represented by the presence of the connecting element which limits the rear visibility to the operator sitting in the cab.

To overcome at least the drawbacks relating to the assembly of the Skid Steer Loaders provided with frames constructed according to the first example of prior art described above, a second type of Skid Steer Loader frames has been developed, which provides for frames comprising two complementary units able to be superposed.

Once joined, the two units give rise to a frame substantially corresponding to the one according to the first example of prior art described above.

In particular a first lower unit comprises the base element and means for mounting the wheels, whilst the second upper unit comprises the vertical walls and the connecting element.

The upper unit is removably fastened over the lower unit by means of bolted connections.

When the machine is assembled, the operative equipment is assembled separately and then positioned over the lower unit.

Subsequently, the upper unit is positioned over the lower unit and the operative equipment and fastened thereto.

However, the second example of prior art described above also has a series of drawbacks.

First of all, frames constructed according to the second example of prior art have the same drawbacks described for the first example of prior art, in terms of maintenance and visibility.

Moreover, a frame composed of two units has a higher cost of construction than the frames of the first example of prior art described, which offsets the benefits obtained by simplifying the Skid Steer Loader assembly.

SUMMARY OF THE INVENTION

In this situation, the technical task constituting the basis for the present invention is to obtain a Skid Steer Loader frame that overcomes the aforementioned drawbacks.

In particular, a technical task of the present invention is to obtain a Skid Steer Loader frame that allows for a rapid assembly of the machine and at the same time has a competitive cost relative to the frames in use today.

Another technical task of the present invention is to obtain a Skid Steer Loader frame that allows for easier access to the operative equipment of the machine during maintenance operations.

A further technical task of the present invention is to obtain a Skid Steer Loader frame that guarantees a good rear visibility to an operator sitting in the cab.

BRIEF DESCRIPTION OF THE DRAWINGS

Further features and advantages of the present invention shall become more readily apparent from the detailed description of a preferred, but not exclusive, embodiment of a Skid Steer Loader frame, illustrated in the accompanying drawings, in which.

DESCRIPTION OF THE PREFERRED EMBODIMENT

Figure 1:
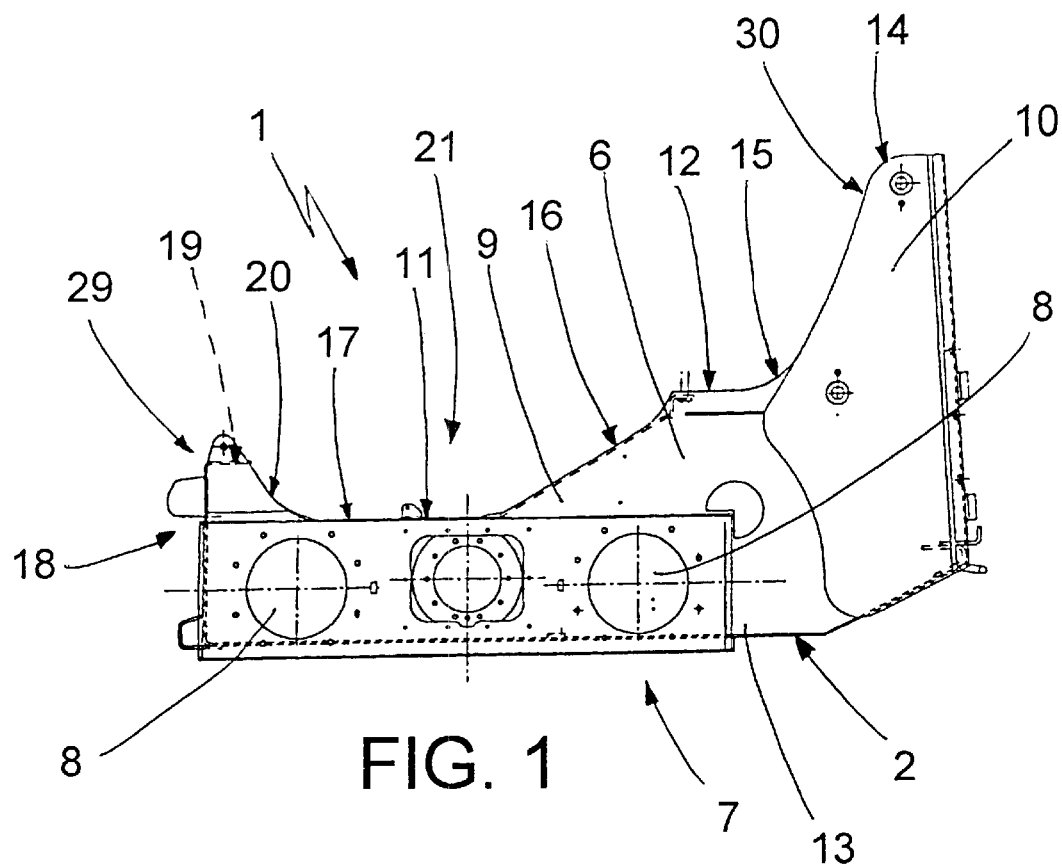
FIG. 1 shows a lateral elevation view of a Skid Steer Loader frame according to the present invention, without stiffening means.

With reference to the aforementioned figures, the reference number 1 globally indicates a Skid Steer Loader frame according to the present invention.

The frame 1 comprises first of all a base element 2 which has, in plan view, a substantially rectangular development.

On said base element 2 can be identified a front edge 3, a rear edge 4 and two lateral edges 5.

To the lateral edges 5 of the base element 2 are fastened two lateral elements 6, substantially specular relative to each other.

Each lateral element 6 is fastened to the lateral edge 5 of the base element 2 in correspondence with its own lower area 7 and it develops substantially vertically relative to said base element 2.

To each lateral element 6 can be operatively associated means for advancing a Skid Steer Loader, such as wheels, able to be fastened in correspondence with appropriate holes 8 obtained on the lateral elements 6 (FIG. 1).

In each lateral element 6 can be further distinguished a base portion 9 developing along the lateral edge 5 of the base element 2, and a coupling portion 10.

The coupling portion 10 is securely fastened over the base portion 9 posteriorly relative to the frame 1.

To the coupling portion 10 can be operatively associated a working arm of a Skid Steer Loader.

The base portion 9 of each lateral element 6 has an upper section 11 destined to be associated in abutment to the lower part of a Skid Steer Loader cab.

Said upper section 11 has a first segment 12 that is substantially parallel to the lower edge 13 of the lateral element 6 which is posteriorly joined to the section 14 of the coupling portion 10 by means of a curvilinear union fitting 15 (FIG. 1).

Anteriorly the first segment 12 is joined with a sharp edge to an inclined segment 16 developing forward and downward relative to the frame 1.

This inclined segment 16 is subsequently joined to a second segment 17 substantially parallel to the lower edge 13 of the lateral element 6, but closer to the lower edge 13 than is the first segment 12.

In correspondence with the front part 18 of the lateral element 6, the upper profile 11 also has a third segment 19 substantially parallel to the lower edge 13 of the lateral element 6 and having a distance from the lower edge 13 that is greater than that of the second segment 17 and smaller than that of the first segment 12. This third segment 19 is joined to the second segment 17 by means of a curvilinear union fitting 20.

In this way the upper profile 11 of the base portion 9 of the lateral element 6 defines a depression 21.

Other embodiments are possible in which the profile of the upper section 11 can vary from the above description, provided that the section always has an area of reduced height (depression 21) similar to the one represented by the second segment 17 in the embodiment illustrated in the accompanying figures.

Figure 2:
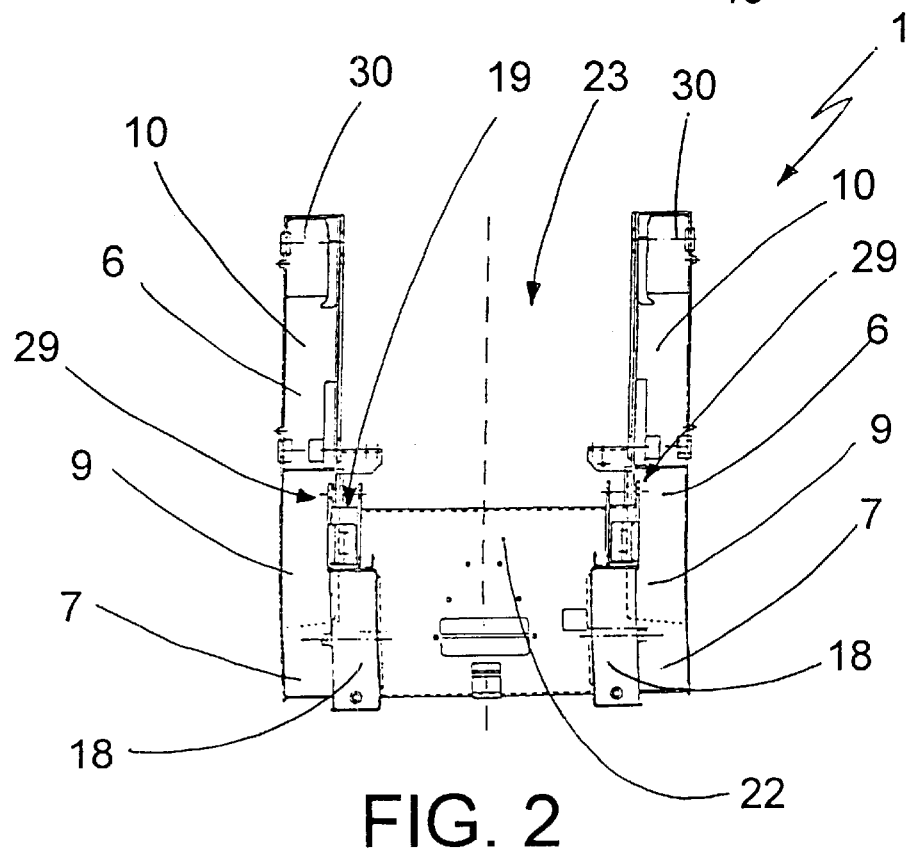
FIG. 2 shows a front view of the frame of FIG. 1.
Figure 3:
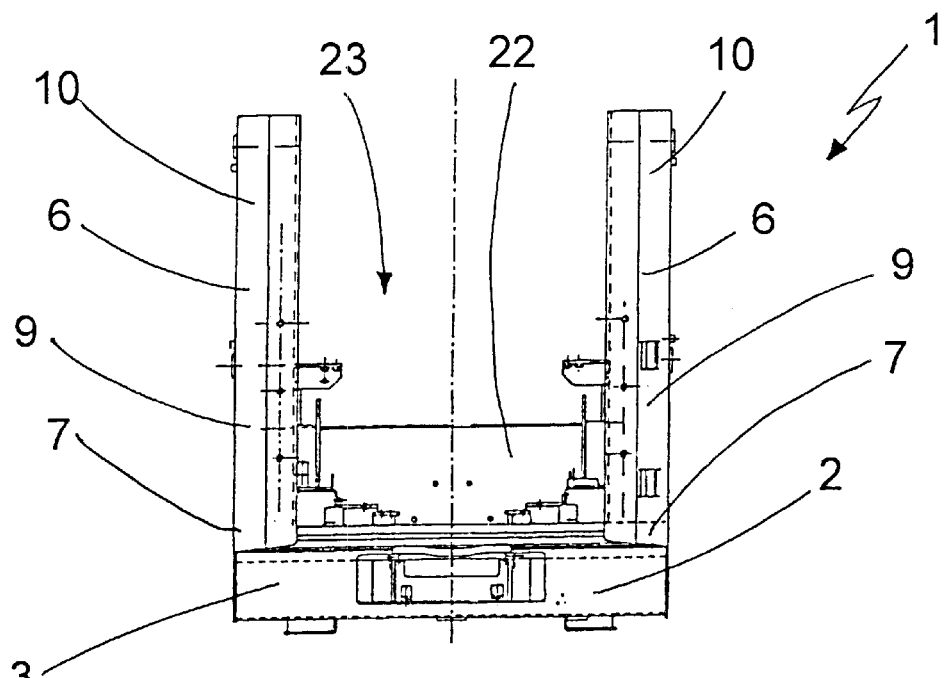
FIG. 3 shows a rear view of the frame of FIG. 1.

A frontal element 22 is integrally fastened, inferiorly, to the front edge 3 of the base element 2 and, laterally, to each of the lateral elements 6, and has a slightly lesser height than the third segment 19 of the upper section 11 of the base portion 9 (FIG. 2).

The lateral elements 6, the front element 22 and the base element 2 define among them a housing compartment 23 destined to house a plurality of operative equipment of a Skid Steer Loader.

Figure 4:
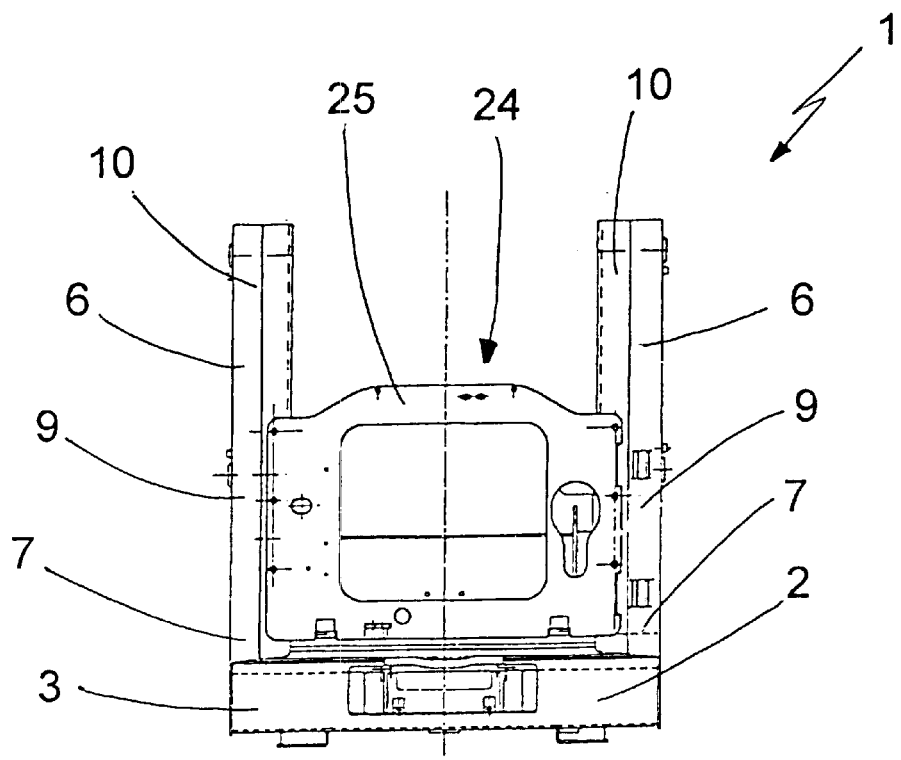
FIG. 4 shows the frame of FIG. 3 with some stiffening means mounted.
Figure 5:
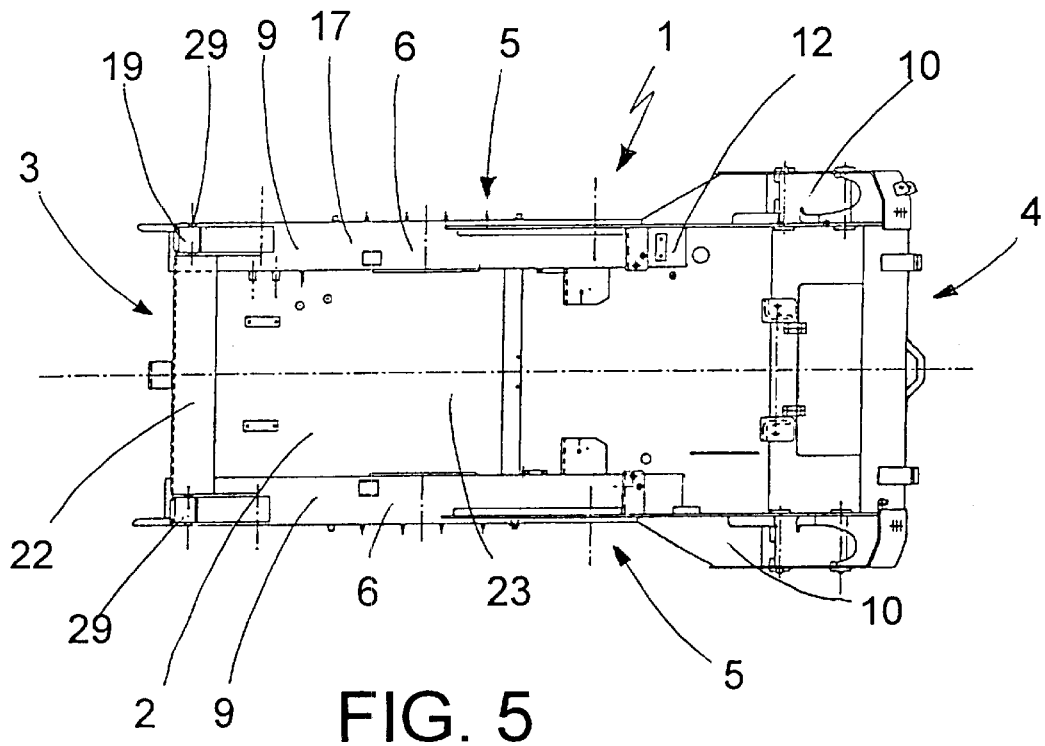
FIG. 5 shows a plan view of the frame of FIG. 1.
Figure 6:
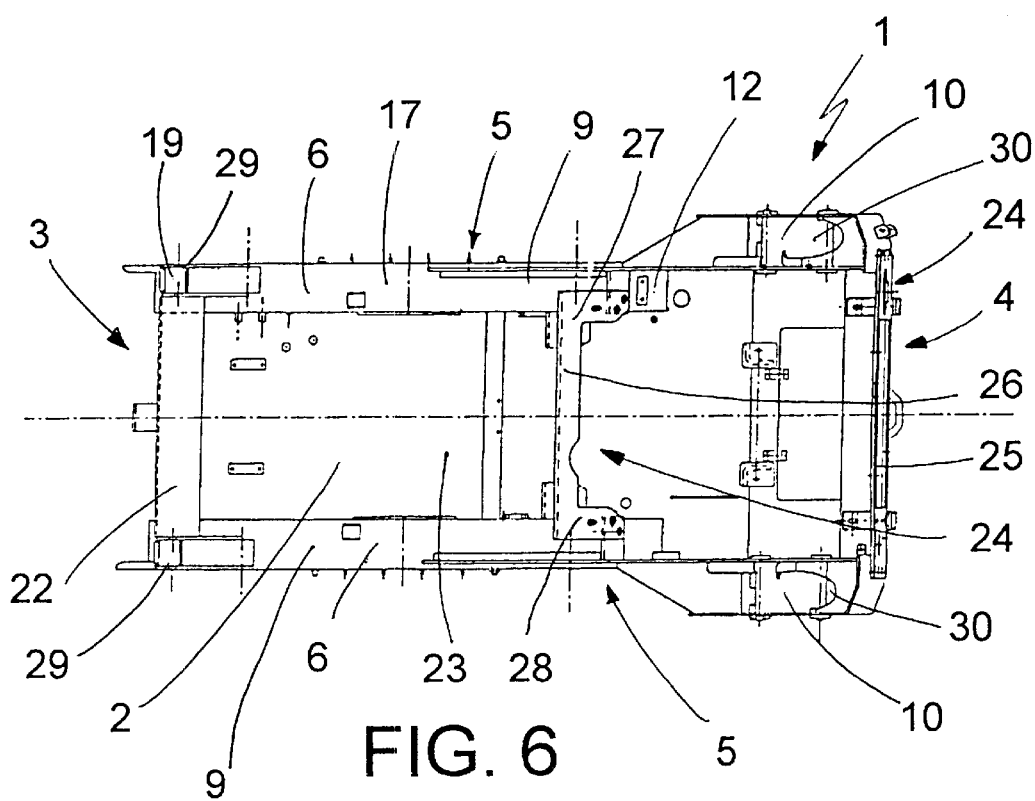
FIG. 6 shows the frame of FIG. 5 with the stiffening means mounted.

The frame 1 according to the present invention further comprises removable stiffening means 24 (FIGS. 4 and 6).

Said stiffening means 24 comprise a rear plate 25 and a transverse bar 26.

The rear plate 25 is fastened in removable fashion to the lateral elements 6 in correspondence with its own sides, whilst, inferiorly, it bears on the rear edge 4 of the base element 2.

The rear plate 25 also has a lesser height than the coupling portion 10 of the lateral elements 6.

The transverse bar 26, which develops substantially above said housing compartment 23, has a first end 27 and a second end 28, each fastened to one of the lateral elements 6 (FIG. 6).

In particular in the illustrated embodiment, the transverse bar 26 is fastened to the base portions 9 of the lateral elements 6 in correspondence with the first segment 12 of their upper section 11.

The frame 1 according to the present invention further comprises a fastening fork 29 integrally fastened onto the third segment 19 of the upper section 11 of each base portion 9, and able to allow connecting the Skid Steer Loader cab to the frame 1.

Advantageously, moreover, the frame 1 also comprises a coupling fork 30 integrally fastened onto the summit of each of the coupling portions 10.

Said coupling fork 30 is destined to allow connecting the Skid Steer Loader operative arm to the frame 1.

When the Skid Steer Loader is assembled, all the operative equipment of the machine, assembled together, is inserted in the housing compartment 23 of the frame 1, lacking the stiffening means 24.

The plate 25 and the bar 26 are then fastened, locking the equipment in the housing compartment 23.

The present invention achieves important advantages.

In the first place the Skid Steer Loader frame of the present invention allows for a rapid assembly of the machine, because it allows the operative equipment to be pre-assembled prior to its insertion in the housing compartment of the frame, thanks to the absence of the connecting element that is typical of prior art machines.

At the same time the frame has a fairly low cost and is easy to construct.

Moreover, the frame allows for excellent accessibility to the operative equipment of the machine for carrying out maintenance operations, thanks to the lowered profile of the two lateral elements in correspondence with their intermediate area.

An additional advantage is provided by the absence of the connecting element that is typical of traditional frames, which guarantees both an excellent rear visibility to an operator sitting in the cab during the operation of the Skid Steer Loader, and a better accessibility to the parts of the engine and transmission of the Skid Steer Loader that need to be serviced daily.

The invention thus conceived can be subject to numerous modifications and variations, without thereby departing from the scope of the inventive concept. All components can be replaced by technically equivalent elements and in practice all materials employed, as well as the shapes and dimensions of the various components, may be any according to needs.

What is claimed is:

1. A Skid Steer Loader frame comprising:
   a base element having substantially rectangular plan development, and having a front edge, a rear edge and lateral edges;
   lateral elements that are essentially specular relative to each other, and fastened in correspondence with their lower area each to one of said lateral edges of the base element, said lateral elements being positioned substantially perpendicular to said base element;
   a front element integrally fastened inferiorly to said front edge of the base element and laterally to each of said lateral elements, said lateral elements being able to be operatively associated to means for advancing the Skid Steer Loader, and having a base portion developing along the lateral edge of the base element, and a coupling portion, integrally fastened over a part of said base portion and posteriorly relative to the base element, and able to be operatively associated to a working arm of the Skid Steer Loader;

the lateral elements, the front element and the base element defining among them a housing compartment for housing a plurality of operative equipment of the Skid Steer Loader;

the base portion of each lateral element having an upper section able to be associated in abutment to a cab of the Skid Steer Loader, and defining, in a zone disposed in front with respect to the coupling portion, a depression for allowing lateral access by an operator to the housing compartment, and removable means for stiffening the frame also being provided.

2. A frame as claimed in claim 1 wherein said stiffening means comprise a rear plate laterally fastened in removable fashion to said lateral elements, and inferiorly bearing on said rear edge of the base element.

3. A frame as claimed in claim 2 wherein said stiffening means further comprise a bar having a first end and a second end, said first and second end being each fastened in removable fashion to one of said lateral elements, said bar developing substantially above said housing compartment.

4. A frame as claimed in claim 1 wherein said stiffening means comprise a bar having a first end and a second end, said first and second end being each fastened in removable fashion to one of said lateral elements, said bar developing substantially above said housing compartment.

5. A frame as claimed in claim 1 wherein said upper section of the base portion of each lateral element has a first segment that is substantially parallel to the lower edge of the lateral element and to which is posteriorly joined a section of the coupling portion, a second segment that is substantially parallel to the lower edge of the lateral element and to which is joined posteriorly the first segment, said second segment being closer to the lower edge than the first segment, and a third segment farther from the lower edge than the second segment, and to which is joined posteriorly the second segment.

6. A frame as claimed in claim 5 wherein said third segment has a height that substantially corresponds to the height of the front element.

7. A frame as claimed in claim 5 further comprising a fastening fork integrally fastened on said third segment of the rear section of the base portion of each lateral element.

8. A frame as claimed in claim 1 further comprising a coupling fork integrally fastened on a summit of each of said coupling portions.

9. A Skid Steer Loader frame comprising:

a base element having substantially rectangular plan development, and having a front edge, a rear edge and lateral edges;

lateral elements that are essentially specular relative to each other, and fastened in correspondence with their lower area each to one of said lateral edges of the base element, said lateral elements being positioned substantially perpendicular to said base element;

a front element integrally fastened inferiorly to said front edge of the base element and laterally to each of said lateral elements, said lateral elements being able to be operatively associated to means for advancing the Skid Steer Loader, and having a base portion developing along the lateral edge of the base element, and a coupling portion, integrally fastened over a part of said base portion and posteriorly relative to the base element, and able to be operatively associated to a working arm of the Skid Steer Loader;

the lateral elements, the front element and the base element defining among them a housing compartment for housing a plurality of operative equipment of the Skid Steer Loader;

the base portion of each lateral element having an upper section able to be associated in abutment to a cab of the Skid Steer Loader, and defining, in a zone disposed in front with respect to the coupling portion, a depression for allowing lateral access by an operator to the housing compartment, removable means for stiffening the frame also being provided, and wherein said stiffening means further comprise a bar having a first end and a second end, said first and second end being each fastened in removable fashion to one of said lateral elements, said bar developing substantially above said housing compartment.

10. A frame as claimed in claim 9 wherein said upper section of the base portion of each lateral element has a first segment that is substantially parallel to the lower edge of the lateral element and to which is posteriorly joined a section of the coupling portion, a second segment that is substantially parallel to the lower edge of the lateral element and to which is joined posteriorly the first segment, said second segment being closer to the lower edge than the first segment, and a third segment farther from the lower edge than the second segment, and to which is joined posteriorly the second segment.

11. A frame as claimed in claim 10 wherein said third segment has a height that substantially corresponds to the height of the front element.

12. A frame as claimed in claim 10 further comprising a fastening fork integrally fastened on said third segment of the rear section of the base portion of each lateral element.

13. A frame as claimed in claim 9 further comprising a coupling fork integrally fastened on a summit of each of said coupling portions.

* * * * *